(12) United States Patent
Agarwal et al.

(10) Patent No.: US 8,224,692 B2
(45) Date of Patent: Jul. 17, 2012

(54) SYSTEM AND METHOD FOR PRICING OF OVERLAPPING IMPRESSION POOLS OF ONLINE ADVERTISEMENT IMPRESSIONS FOR ADVERTISING DEMAND

(75) Inventors: Deepak K. Agarwal, Sunnyvale, CA (US); John Anthony Tomlin, Sunnyvale, CA (US); Jian Yang, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 629 days.

(21) Appl. No.: 12/263,406

(22) Filed: Oct. 31, 2008

(65) Prior Publication Data
US 2010/0114721 A1 May 6, 2010

(51) Int. Cl.
*G06Q 30/00* (2012.01)
(52) U.S. Cl. ...................................... 705/14.1
(58) Field of Classification Search .................. 705/14.1
See application file for complete search history.

(56) References Cited

U.S. PATENT DOCUMENTS
2004/0225562 A1* 11/2004 Turner ............................. 705/14

* cited by examiner

*Primary Examiner* — Daniel Lastra
(74) *Attorney, Agent, or Firm* — Buchenhorner Patent Law

(57) ABSTRACT

An improved system and method for pricing of overlapping impression pools of online advertisement impressions for advertising demand is provided. An inventory of online advertisement impressions may be grouped in impression pools according to attributes of the advertisement impressions and advertisers' requests for impressions targeting specific attributes may be received. An optimal price may be computed for each of the impression pools of the inventory of online advertisement impressions using dual values of an optimization program. The values of a dual variable for prices of impression pools on the supply constraints of an objective function for allocating the impression pools may be extracted and iteratively increased on those impression pools which have a dual value greater than the book rate value.

14 Claims, 4 Drawing Sheets

SYSTEM AND METHOD FOR PRICING OF OVERLAPPING IMPRESSION POOLS OF ONLINE ADVERTISEMENT IMPRESSIONS FOR ADVERTISING DEMAND

FIELD OF THE INVENTION

The invention relates generally to computer systems, and more particularly to an improved system and method for pricing of overlapping impression pools of online advertisement impressions for advertising demand.

BACKGROUND OF THE INVENTION

Traditionally, there are two common internet advertising market segments. One is the text advertisement segment, and the other is the banner segment. Text advertisements are generally segments of text that may be linked to the advertiser's web site via a hypertext link. The text advertisement business is mainly conducted through sponsored search auction and content match technologies. Content matching is a widely used mechanism for selling online advertising by matching advertisements to content published on the Internet. Each time a user requests published content, advertising space may be allocated within the content served in response to the user's request. For instance, page content may be aggregated into keywords, and advertisements may be match to content using the highest payment offered by an advertiser for the keywords representing the content.

For the banner advertising segment, behavioral targeting technology has been used, where both users and advertisements are mapped into categories, and then advertisements with the highest payments offered by an advertisers that are in the same categories with a user will be served to that user. Unfortunately, the categories may be defined by marketing personnel relying on their experience, rather than by the interests of the users. Moreover, the categories may be defined in a hierarchy that may focus on vertical areas such as travel or shopping, and thus may unnecessarily restrict selection of an advertisement within a vertical, instead of considering the broader interests of the users and a representative sample of display properties for advertisers.

What is needed is a way to allocate and price advertisements that provide a representative sample of display properties for advertisers and take into account of the value of the unused inventory. Such a system and method should consider users' experience and interests to provide more relevant advertisements and should provide a representative sample of display properties for advertisers.

SUMMARY OF THE INVENTION

The present invention provides a system and method for pricing of overlapping impression pools of online advertisement impressions for advertising demand. A pricing engine may be provided that prices advertisement impressions allocated using an optimization program from impression pools to satisfy requests from advertisers. The pricing engine may be operably coupled to an allocation and pricing optimizer that provides dual values associated with supply constraints from an optimization program that allocates advertisement impressions from impression pools. In an embodiment, the pricing engine may price impression pools of advertisement using the dual values of an objective function that allocates the impression pools. The objective function may be a weighted composite of maximizing the cost of unused inventory and proportionally allocating a set of impression pools which can supply advertisers' requests. The values of the dual variable for prices of impression pools on the supply constraints may be extracted and iteratively set until the change between the dual value and an expected value, initialized to be at least equal to the book rate value, is less than a threshold. Accordingly, optimal prices for impression pools may be set when the marginal value of one or more pools of inventory are greater than the book rate value.

An inventory of online advertisement impressions may be grouped in impression pools according to attributes of the advertisement impressions and advertisers' requests for impressions targeting specific attributes may be received. A book rate value may be obtained for each of the impression pools of the inventory of online advertisement impressions and an optimal price may be computed for each of the impression pools of the inventory of online advertisement impressions using dual values from an optimization program that allocates the advertisement impressions from the impression pools. In an implementation, the values of the dual variable for prices of impression pools on the supply constraints of an objective function for allocating the impression pools may be extracted and iteratively increased on those impression pools which have a dual value greater than the book rate value.

The present invention may be used by many applications for pricing of overlapping impression pools of online advertisement impressions for advertising demand. For example, online banner advertising applications may use the present invention to price online advertisement impressions that satisfy advertising demand. Or online content-match advertising applications may use the present invention to price online advertisement impressions for available advertising space displayed with content requested by a user. Similarly, advertising applications for email may use the present invention to price online advertisement impressions for available advertising space displayed with a message from an inbox requested by a user. For any of these online advertising applications, advertisement impressions allocated from overlapping impression pools may be priced using the present invention to satisfy advertising demand.

Other advantages will become apparent from the following detailed description when taken in conjunction with the drawings, in which:

DETAILED DESCRIPTION

Exemplary Operating Environment

Figure 1:
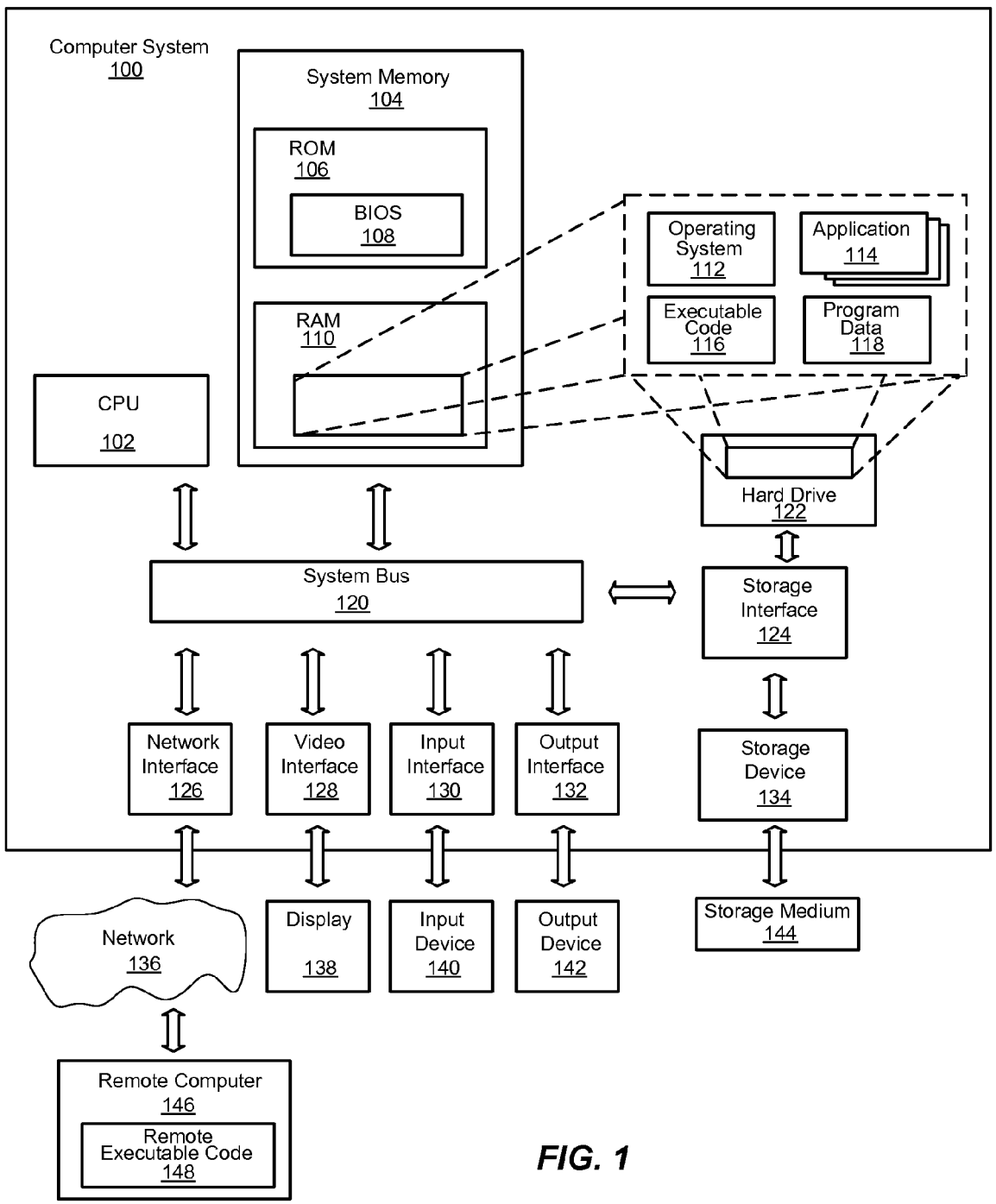
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used. Those skilled in the art will also appreciate that many of the components of the computer system 100 may be implemented within a system-on-a-chip architecture including memory, external interfaces and operating system. System-on-a-chip implementations are common for special purpose hand-held devices, such as mobile phones, digital music players, personal digital assistants and the like.

Pricing of Overlapping Impression Pools of Online Advertisement Impressions for Advertising Demand The present invention is generally directed towards a system and method for pricing of overlapping pools of online advertisement impressions for advertising demand. An inventory of online advertisement impressions may be grouped in impression pools according to attributes of the advertisement impressions and advertisers' requests for impressions targeting specific attributes may be received. An optimal price may be computed for each of the impression pools of the inventory of online advertisement impressions using dual values from an optimization program that allocates advertisement impressions from impression pools. The values of a dual variable for prices of impression pools on the supply constraints of an objective function for allocating the impression pools may be extracted and iteratively increased on those impression pools which have a dual value greater than the book rate value. As used herein, book rate may means a historical price paid for the advertisement impression.

As will be seen, optimal prices for impression pools may be set when the marginal value of one or more pools of inventory are greater than the book rate value. As will be understood, the various block diagrams, flow charts and scenarios described herein are only examples, and there are many other scenarios to which the present invention will apply.

Figure 2:
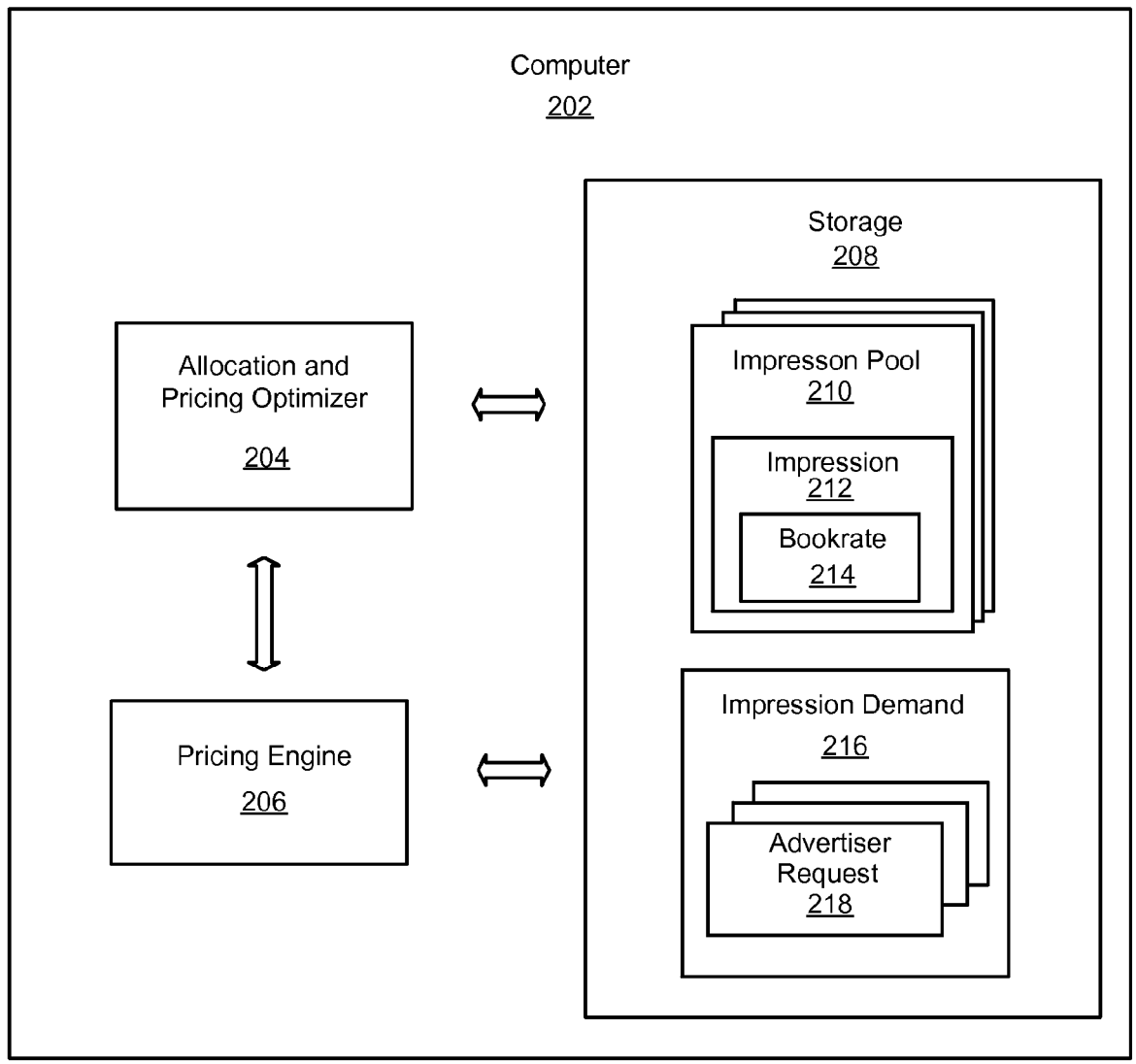
FIG. 2 is a block diagram generally representing an exemplary architecture of system components for pricing of overlapping impression pools of online advertisement impressions for advertising demand, in accordance with an aspect of the present invention.

Turning to FIG. 2 of the drawings, there is shown a block diagram generally representing an exemplary architecture of system components for pricing of overlapping impression pools of online advertisement impressions for advertising demand. Those skilled in the art will appreciate that the functionality implemented within the blocks illustrated in the diagram may be implemented as separate components or the functionality of several or all of the blocks may be implemented within a single component. For example, the functionality of the pricing engine 206 may be implemented as a component within the allocation and pricing optimizer 204. Or the functionality of the pricing engine 206 may be implemented as a separate component from the allocation and pricing optimizer 204 as shown. Moreover, those skilled in the art will appreciate that the functionality implemented within the blocks illustrated in the diagram may be executed on a single computer or distributed across a plurality of computers for execution.

In various embodiments, a computer 202, such as computer system 100 of FIG. 1, may include an allocation and pricing optimizer 204 and a pricing engine 206, each operably coupled to storage 208. The storage 208 may be any type of computer-readable storage media and may store impression pools 210 of advertisement impressions 212 with a book rate 214 that represents the price paid for the impression by an advertiser. The storage 208 may also store impression demand 216 of advertiser requests 218 for advertisement impressions 212.

The allocation and pricing optimizer 204 may allocate advertisement impressions 212 from impression pools 210 to advertiser requests 218 to satisfy impression demand 216.

The allocation and pricing optimizer 204 may solve linear or nonlinear programming models that may be determined by an objective function such as a distance or representativeness function which may be linear or nonlinear, including quadratic or log-linear functions. In an embodiment, the allocation and pricing optimizer 204 may produce a primal solution for an optimization program to allocate advertisement impressions 212 to advertiser requests 218. Additionally, the allocation and pricing optimizer 204 may produce a dual solution for the optimization program of values that may be used by the pricing engine 206 for pricing advertisement impressions allocated by the primary solution. Using values generated by the allocation and pricing optimizer 204, the pricing engine 206 may price allocated advertisement impressions 212 from impression pools 210 to advertiser requests 218 that satisfy impression demand 216. In an embodiment, the pricing engine 206 may use dual values associated with supply constraints from a primal solution of an optimization program applied to allocate advertisement impressions 212 to advertiser requests 218. Each of these components may be any type of executable software code that may execute on a computer such as computer system 100 of FIG. 1, including a kernel component, an application program, a linked library, an object with methods, or other type of executable software code. Each of these components may alternatively be a processing device such as an integrated circuit or logic circuitry that executes instructions represented as microcode, firmware, program code or other executable instructions that may be stored on a computer-readable storage medium. Those skilled in the art will appreciate that these components may also be implemented within a system-on-a-chip architecture including memory, external interfaces and an operating system.

There may be many applications which may use the present invention for pricing of overlapping impression pools of online advertisement impressions for advertising demand. For example, online banner advertising applications may use the present invention to price online advertisement impressions that satisfy advertising demand. Or online content-match advertising applications may use the present invention to price online advertisement impressions for available advertising space displayed with content requested by a user. Similarly, advertising applications for email may use the present invention to price online advertisement impressions for available advertising space displayed with a message from an inbox requested by a user. For any of these online advertising applications, advertisement impressions allocated from overlapping impression pools may be priced to satisfy advertising demand.

In general, the inventory of impressions may be grouped and organized into impression pools by a set of attributes. A set of attributes may be any combination of one or more attributes associated with web page display properties, with web browser properties, with one or more users including demographics, online behavior, and so forth. Each impression pool may represent a disjoint set of attributes. For example, the set of attributes for an impression pool may include males between the ages of 20 and 30 living in the U.S. While each of the impression pools may represent a disjoint set of attributes, an inventory impression may belong to two or more impression pools, in which case the impression pools may be considered to overlap with one another. For instance, advertisement impressions in an impression pool that includes an attribute of "male" may also occur in another impression pool that includes an attribute of "living in the U.S." Thus, the impression pools of impressions may be referred to as "overlapping."

An Internet advertising service may receive numerous requests from advertisers. Each of these requests may identify a specific number of impressions that are desired that satisfy a particular set of attributes. For instance, an advertiser may request that the Internet advertising service provide a million impressions targeted to males. An Internet advertising service has a number of options available to it to satisfy such a request, since there may be a number of disjoint impression pools that include the attribute of "male." For example, the males may be living in the U.S. or outside the U.S., as well as within various age ranges. As a result, there are a number of different ways that the Internet advertising service may satisfy this request from the different disjoint impression pools that include the attribute of "male."

Consider the indices of the disjoint impression pools to be denoted by $j=1, \ldots, J$, and $s_j$ to denote size of the disjoint impression pool j. The expected future value of inventory in disjoint pool j may be denoted by $V_j$. Also consider the indices of the requested inventory sets to be denoted by $k=1, \ldots, K$, and $d_k$ to denote the aggregate requested volume for demand profile k. An allocation of impression pools that may supply the requested volume for requested inventory sets may be optimized in any number of ways. Consider the set of impression pools which can supply demand k to be denoted by $S_k$, and the set of demands which can be supplied by pool j to be denoted by $\overline{S}_j$. An allocation of impression pools that may supply the requested volume for requested inventory sets may be optimized for an Internet advertising service by maximizing the total cost of unused inventory. In this case, such an objective function may be to maximize $\Sigma_j V_j y_j$ subject to the supply constraints, $$\sum_{k \in \overline{S}j} x_{jk} = s_j$$

$$\forall j = 1, \ldots, J,$$

and the demand constraints, $$\sum_{j \in S_k} x_{jk} = d_k$$

$$\forall k = 1, \ldots, K+1,$$

where $y_j$ denotes unused inventory in pool j and where $x_{jk}$ denotes the volume of impression pool j inventory assigned to request(s) for inventory type k.

Or an allocation may be optimized for advertisers by allocating a representative sample of inventory for each advertiser. In this case, an objective function may be to maximize an entropy function $$E = -\sum_{j,k} x_{jk} \ln(x_{jk}),$$

also subject to the supply constraints, $$\sum_{k \in \overline{S}j} x_{jk} = s_j$$

$$\forall j = 1, \ldots, J,$$

and the demand constraints, $$\sum_{j \in S_k} x_{jk} = d_k$$

$$\forall k = 1, \ldots, K+1.$$

Or an allocation may be optimized to meet both objectives in an embodiment. In this case, an objective function may be a weighted composite of maximizing the cost of unused inventory and a proportional allocation of a set of impression pools which can supply demand k that may provide a representative sample of available inventory for advertisers. For example, the objective function may be to maximize $$\sum_j V_j x_{j,K+1} - \gamma \sum_{j,k} x_{jk} \ln(x_{jk}),$$

subject to the supply constraints, $$\sum_{k \in \overline{S}j} x_{jk} = s_j$$

$$\forall j = 1, \ldots, J,$$

and the demand constraints, $$\sum_{j \in S_k} x_{jk} = d_k$$

$$\forall k = 1, \ldots, K+1.$$

In various embodiments that may ensure representative allocation relative to some pre-defined allocation $x_{jk0}$, the objective function may be to maximize $$\sum_j V_j x_{j,K+1} - \gamma \sum_{j,k} [(x_{jk} - x_{jk0})^2 / 2x_{jk0}],$$

where $$x_{jk0} = \frac{s_j d_k}{\Sigma_{j: \overline{S}_j \subseteq S_k} s_j} \forall j$$

such that $\overline{S}_j \subseteq S_k$. Such an objective function may be a weighted composite of maximizing the cost of unused inventory while providing a proportional allocation of a set of impression pools which can supply demand k and may be described in further detail by copending U.S. patent application Ser. No. 12/125,877, entitled "FAIR ALLOCATION OF OVERLAPPING INVENTORY".

Any of these objective functions for allocating inventory from impression pools subject to demand and supply constraints may be computed using a linear or nonlinear programming model. An optimizer, for instance, may apply nonlinear programming to allocate advertisement impressions to advertiser requests for any of the objective functions described above with the demand and supply constraints.

Those skilled in the art will appreciate that a dual values associated with supply constraints from a primal solution of an optimization program applied to allocate advertisement impressions may be used to compute an optimal price for each of the impression pools. An allocation and pricing optimizer, for instance, may apply a non-linear program to allocate advertisement impressions for an objective functions and extract values of the dual variable of the supply constraint from the non-linear program solution. The extracted values of the dual variable for prices of impression pools on the supply constraints may be iteratively set to be at least equal to the floor or book rate value and increased on those impression pools which have a dual value greater than the book rate value. Accordingly, optimal prices for impression pools may be set when the marginal value of one or more pools of inventory are greater than the book rate price.

Figure 3:
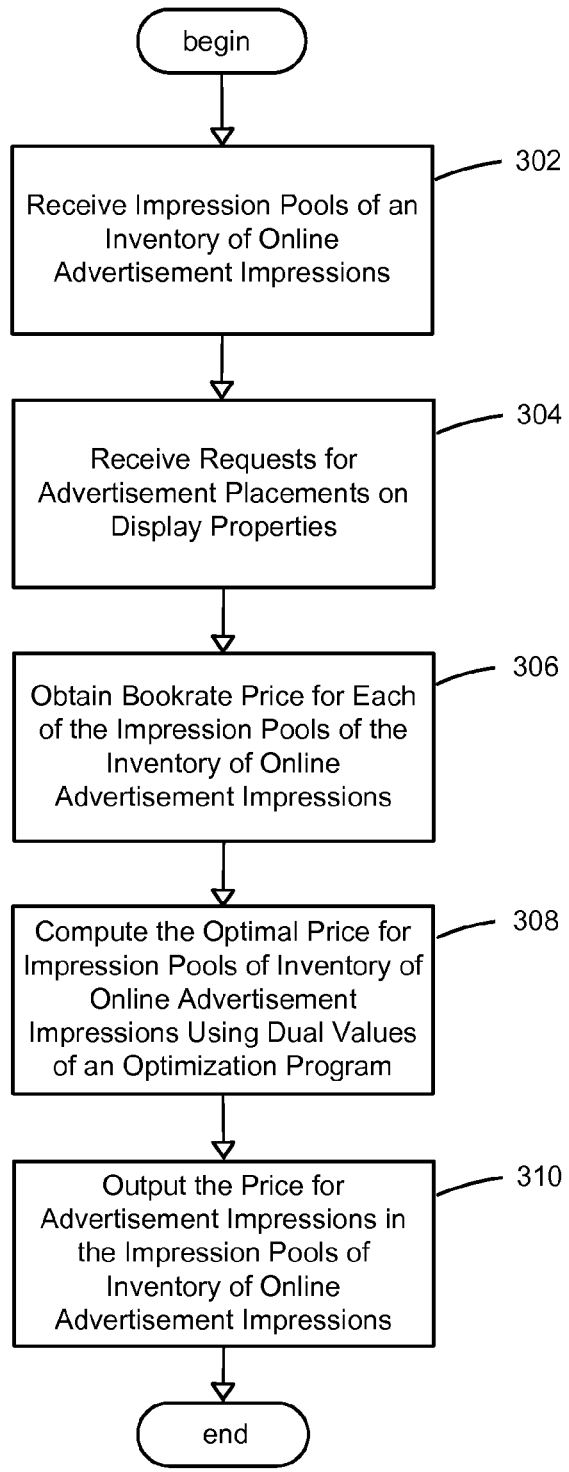
FIG. 3 presents a flowchart generally representing the steps undertaken in one embodiment for pricing advertisement impressions allocated from impression pools to advertiser requests that satisfy impression demand, in accordance with an aspect of the present invention.

FIG. 3 presents a flowchart generally representing the steps undertaken in one embodiment for pricing advertisement impressions allocated from impression pools to advertiser requests that satisfy impression demand. At step 302, impression pools of an inventory of online advertisement impressions may be received. In an embodiment, the advertisement impressions may be grouped in impression pools according to attributes of the advertisement impressions. For instance, the impression attributes may include web page attributes, user attributes, web browser attributes and so forth. Requests for advertisement placements on display advertising properties may be received at step 304. As used herein, a display advertising property may mean a collection of related web pages that may have advertising space allocated for displaying advertisements. In an embodiment, the impression demand of advertiser requests for impressions targeting specific attributes may be received.

At step 306, a book rate price may be obtained for each of the impression pools of the inventory of online advertisement impressions. An optimal price may be computed at step 308 for each of the impression pools of the inventory of online advertisement impressions using a dual variable of an optimization program. In an embodiment, the values of the dual variable for prices of impression pools on the supply constraints may be extracted and iteratively set to be at least equal to the floor or book rate value and increased on those impression pools which have a dual value greater than the book rate value. And the optimal price computed for advertisement impressions in the impression pools of the inventory of online advertisement impressions may be output at step 310.

Figure 4:
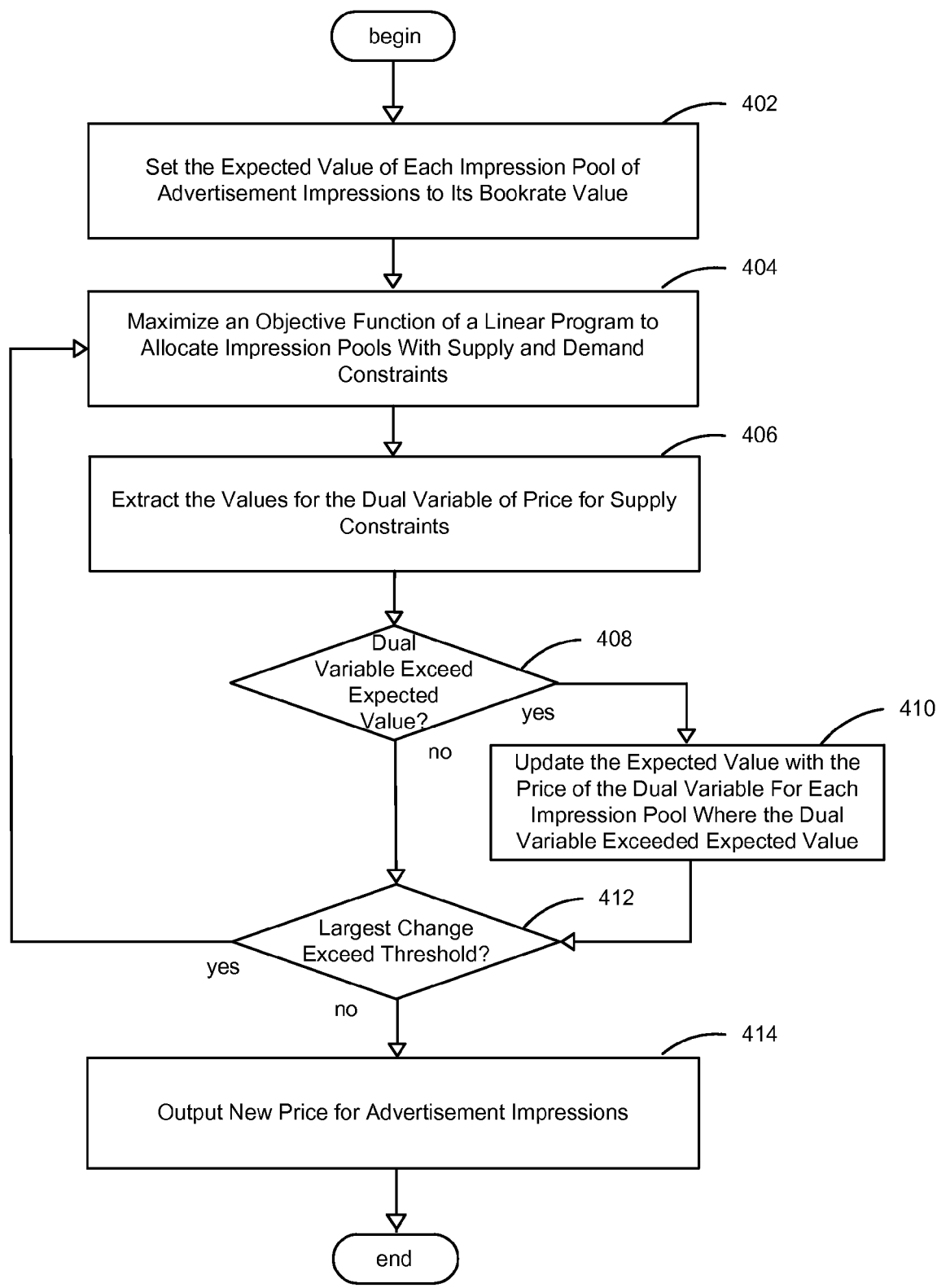
FIG. 4 is a flowchart generally representing the steps undertaken in one embodiment for pricing advertisement impressions using values of a dual variable for prices of impression pools on the supply constraints of an objective function for allocating the impression pools, in accordance with an aspect of the present invention.

FIG. 4 presents a flowchart generally representing the steps undertaken in one embodiment for pricing advertisement impressions using values of a dual variable for prices of impression pools on the supply constraints of an objective function for allocating the impression pools. At step 402, an expected value of each impression pool of advertisement impressions may be set to its book rate value. Noting that the dual to the optimization program to maximize the objective function $$\sum_j V_j x_{j,K+1} - \gamma \sum_{j,k} [(x_{jk} - x_{jko})^2 / 2x_{jko}]$$

has the constraints of $\lambda_j \geq V_j$ $\forall j$, the expected value for each impression pool, $V_j$ for all $j$, may be initialized to the book rate value. In an embodiment, the book rate may be the historical value for advertisement impressions in the impression pool.

At step 404, an objective function of an optimization program to allocate impression pools with demand and supply constraints may be maximized. In an embodiment, the objective function $$\sum_j V_j x_{j,K+1} - \gamma \sum_{j,k} [(x_{jk} - x_{jko})^2 / 2x_{jko}]$$

may be maximized subject to the supply constraints, $$\sum_{k \in S_j} x_{jk} = s_j$$

$$\forall j = 1, \ldots, J,$$

and the demand constraints, $$\sum_{j \in S_k} x_{jk} = d_k$$

$$\forall k = 1, \ldots, K+1.$$

At step 406, the values of the dual variable for prices, $\lambda_j$, for the supply constraints may be extracted. At step 408, it may be determined whether any value of the dual variable for price of an impression pool exceeds the expected value of the impression pool. If it may not be determined that any value of the dual variable for price of an impression pool exceeds the expected value of the impression pool, then processing may continue at step 412. If it may be determined that any value of the dual variable for price of an impression pool exceeds the expected value of the impression pool, then the expected value of an impression pool may be updated with the value of the dual variable for price at step 410 where the value of the dual variable for price exceeds the expected value of the impression pool. In an embodiment, the expected value of an impression pool may be updated using a weighted function, $V_j \leftarrow \alpha \lambda_j + (1-\alpha) V_j$, where $\alpha$ is a damping factor such that $0 < \alpha < 1$.

At step 412, it may be determined whether the largest change of an expected value of an impression pool exceeded a threshold. In an embodiment, the threshold may be the expected value of an impression pool plus epsilon, which may be set to 10% of the expected value of an impression pool. If it may be determined that the largest change exceeded the threshold, then processing may continue at 404 where an objective function of a linear program to allocate impression pools with the supply constraints may be maximized. Otherwise, if it may not be determined that the largest change exceeded the threshold, then the prices for the advertisement impressions in the impression pools may be output at step 414.

Thus the present invention may apply an optimization program to price allocated advertisement impressions for an objective functions using values of a dual variable of a supply constraint. The values of the dual variable for prices of impression pools on the supply constraints may be extracted and iteratively set until the change between the dual value and an expected value, initialized to be at least equal to the book rate value, is less than a threshold. Accordingly, optimal prices for impression pools may be set when the marginal value of one or more pools of inventory are greater than the book rate price. Importantly, the present invention may price advertisement impressions for impression pools allocated using any well-behaved objective function subject to supply and demand constraints by using values of a dual variable of a supply constraint.

As can be seen from the foregoing detailed description, the present invention provides an improved system and method for pricing of overlapping impression pools of online advertisement impressions for advertising demand. Impression pools of the inventory of online advertisement impressions may be received and a book rate price may be obtained for each of the impression pools of the inventory of online advertisement impressions. An optimal price may be computed for each of the impression pools of the inventory of online advertisement impressions using dual values of an optimization program. In an implementation, the values of the dual variable for prices of impression pools on the supply constraints may be extracted and iteratively set to be at least equal to the floor or book rate value and increased on those impression pools which have a dual value greater than the book rate value. And the optimal price computed for advertisement impressions in the impression pools of the inventory of online advertisement impressions may be output. Advantageously, the system and method of the present invention may be generally applied to any well-behaved objective function subject to supply and demand constraints for allocating impression pools of advertisements that satisfy advertisers' demands. As a result, the system and method provide significant advantages and benefits needed in contemporary computing, and more particularly in online advertising applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for pricing online advertising, comprising:
   a pricing engine that prices a plurality of advertisement impressions allocated from a plurality of impression pools to a plurality of requests from a plurality of advertisers;
   an allocation and pricing optimizer operably coupled to the pricing engine that provides dual values associated with supply constraints from an optimization program that allocates the advertisement impressions from the plurality of impression pools using linear programming;
   and a storage operably coupled to the pricing engine that stores:
      the plurality of impression pools, each impression pool comprising a plurality of advertisement impressions with a book rate associated with each of the advertisement impressions that represents a historical price paid for each of the advertisement impressions; and
      impression demand of the plurality of requests from the plurality of advertisers.

2. A non-transitory computer-readable medium having computer-executable instructions stored therein that when executed, enable a computer to perform:
   pricing a plurality of advertisement impressions allocated from a plurality of impression pools to a plurality of requests from a plurality of advertisers;
   providing dual values associated with supply constraints from an optimization program that allocates the advertisement impressions from the plurality of impression pools using linear programming;
   storing the plurality of impression pools, each impression pool comprising a plurality of advertisement impressions with a book rate associated with each of the advertisement impressions that represents a historical price paid for each of the advertisement impressions; and
   impression demand of the plurality of requests from the plurality of advertisers.

3. A computer-implemented method for pricing online advertising, comprising:
   using an input/output subsystem configured to perform:
      receiving a plurality of impression pools of a plurality of advertisement impressions, wherein each impression pool comprises a book rate associated with each of the advertisement impressions, said book rate representing a historical price paid for each of the advertisement impressions; and
      receiving a plurality of requests for a plurality of advertisement placements on a plurality of display properties;
   using a processor device configured to perform computing an optimal price for each of the plurality of impression pools of the plurality of advertisement impressions using dual values from an optimization program that allocates the plurality of advertisement impressions from the plurality of impression pools;
   and outputting the optimal price for each of the plurality of impression pools of the plurality of advertisement impressions computed using the dual values from the optimization program.

4. The method of claim 3 further comprising obtaining a value for each of the plurality of impression pools of the plurality of advertisement impressions.

5. The method of claim 3 wherein computing the optimal price for each of the plurality of impression pools of the plurality of advertisement impressions using dual values from the optimization program comprises setting an expected value for each of the plurality of impression pools of the plurality of advertisement impressions to a book rate.

6. The method of claim 3 wherein computing the optimal price for each of the plurality of impression pools of the plurality of advertisement impressions using dual values from the optimization program comprises maximizing an objective function to allocate impression pools with supply and demand constraints.

7. The method of claim 6 further comprising extracting the dual values for the supply constraints.

8. The method of claim 7 further comprising determining whether a dual value exceeds an expected value of an impression pool.

9. The method of claim 8 further comprising updating the expected value of the impression pool with a dual value for the impression pool if the dual value exceeds the expected value of the impression pool.

10. The method of claim 9 further comprising determining whether a change of an expected value of an impression pool exceeds a threshold.

11. The method of claim 9 further comprising maximizing the objective function to allocate impression pools with updated values for the supply and demand constraints.

12. The method of claim 3 wherein computing the optimal price for each of the plurality of impression pools of the plurality of advertisement impressions using dual values from the optimization program comprises iteratively increasing an expected value of at least one of the plurality of impression pools of the plurality of advertisement impressions.

13. The method of claim 3 wherein computing the optimal price for each of the plurality of impression pools of the plurality of advertisement impressions using dual values from the optimization program comprises using values of a dual variable of the supply constraint from an optimization program that maximizes an objective function with supply and demand constraints to allocate the plurality of impression pools.

14. The method of claim 3 wherein computing the optimal price for each of the plurality of impression pools of the plurality of advertisement impressions using dual values from the optimization program comprises increasing an expected value of at least one of the plurality of impression pools of the plurality of advertisement impressions using a weighted function.

* * * * *